(12) United States Patent
Ramanathan et al.

(10) Patent No.: US 10,735,406 B1
(45) Date of Patent: Aug. 4, 2020

(54) CUSTOMER CENTRIC GRID FOR CUSTOMER SERVICES

(71) Applicant: Wells Fargo Bank, N.A., San Francisco, CA (US)

(72) Inventors: Ramanathan Ramanathan, Bellevue, WA (US); Suhas D. Sankolli, Charlotte, NC (US); Rameshchandra B. Ketharaju, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 291 days.

(21) Appl. No.: 15/386,732

(22) Filed: Dec. 21, 2016

(51) Int. Cl.
*H04L 29/06* (2006.01)
*G06F 21/62* (2013.01)

(52) U.S. Cl.
CPC ...... *H04L 63/0838* (2013.01); *G06F 21/6245* (2013.01); *H04L 63/108* (2013.01)

(58) Field of Classification Search
CPC .......... H04L 63/0838; H04L 63/108; G06F 21/6245
USPC .......................................................... 726/28
See application file for complete search history.

(56) References Cited

U.S. PATENT DOCUMENTS

| | | | |
|---|---|---|---|
| 6,535,855 B1 | 3/2003 | Cahill et al. | |
| 8,606,647 B2 | 12/2013 | Sines et al. | |
| 8,693,737 B1 | 4/2014 | Newman et al. | |
| 2002/0055906 A1* | 5/2002 | Katz | G06Q 20/10 705/39 |
| 2003/0154120 A1* | 8/2003 | Freishtat | G06Q 30/00 705/26.41 |
| 2006/0253584 A1* | 11/2006 | Dixon | G06Q 30/02 709/225 |
| 2008/0077506 A1* | 3/2008 | Rampell | G06Q 20/12 705/26.1 |
| 2013/0245849 A1 | 9/2013 | Paul et al. | |
| 2014/0090039 A1 | 3/2014 | Bhow | |
| 2016/0125412 A1* | 5/2016 | Cannon | G06Q 20/4014 705/44 |
| 2017/0235792 A1* | 8/2017 | Mawji | G06F 17/30424 707/769 |
| 2017/0278117 A1* | 9/2017 | Wallace | G06Q 30/0203 |

* cited by examiner

*Primary Examiner* — Kambiz Zand
*Assistant Examiner* — Benjamin A Kaplan
(74) *Attorney, Agent, or Firm* — Merchant & Gould P.C.

(57) ABSTRACT

A method implemented on an electronic computing device for facilitating access to user information includes receiving from a user data to be made available for access on the electronic computing device. A time duration for which the data is permitted to be accessed is received from the user. Conditions to be met in order for one of a plurality of entities to access the data are received from the user. A request from an entity is received to access the data. A determination is made as to whether the entity satisfies the conditions. A determination is made as to whether a time at which the request is made is within the time duration. When the entity satisfies the conditions and when the request is made within the time duration, the entity is permitted to access the data.

13 Claims, 12 Drawing Sheets

400

402 — Welcome Customer

404 — Customer ID 12345

406 — ☐ Create / Edit Profile

408 — ☐ View Vendors

410 — ☐ Subscribe to Vendors

412 — ☐ Create Requests for Offers

414 — ☐ View Offers

416 — ☐ View Data to be Shared

FIG. 5

Customer Profile — 502

Personal Information — 504

| | | Import? 550 | Share? 552 |
|---|---|---|---|
| Name 508— | [box] | ☐ | ☐ |
| Address 510— | [box] | ☐ | ☐ |
| Telephone 512— | [box] | ☐ | ☐ |
| Email 514— | [box] | ☐ | ☐ |
| Age 516— | [box] | ☐ | ☐ |
| Spouse's Name 518— | [box] | ☐ | ☐ |
| Spouse's Age 520— | [box] | ☐ | ☐ |
| Children 522— | [box] | ☐ | ☐ |
| Vehicles 524— | [box] | ☐ | ☐ |
| Own Home? 526— | [box] | ☐ | ☐ |
| Mortgage Information 528— | [box] | ☐ | ☐ |

Personal Interests — 506

| | | |
|---|---|---|
| 530— ☐ | Car Loans | |
| 532— ☐ | Personal Loans | |
| 534— ☐ | Vacations | |
| 536— ☐ | College Savings | |
| 538— ☐ | Refinance Mortgage | |
| 540— ☐ | Retirement Savings | |
| 542— ☐ | Home Remodeling | |
| 544— ☐ | Credit Cards | |
| 546— ☐ | Other | |
| 548— [box] | | |

FIG. 6

CUSTOMER CENTRIC GRID FOR CUSTOMER SERVICES

BACKGROUND

Customers commonly provide personal information to financial institutions and other entities. For example, customers can provide name and address information, date of birth and social security number information and information regarding personal assets to financial institutions when opening an account at the financial institution. Customers can provide similar information to other organizations, for example government agencies, for example when applying for a driver's license or passport.

The financial institutions and other organizations can make some or all of the customer personal information available to third parties. However, the customers are not always in control of their personal information or aware of what information is being made available to the third parties.

SUMMARY

Embodiments of the disclosure are directed to a method implemented on a first electronic computing device for facilitating access to user information, the method comprising: receiving from a user first data to be made available for access on the first electronic computing device; receiving from the user a first time duration for which the first data is permitted to be accessed; receiving from the user first conditions to be met in order for one of a plurality of entities to access the first data, an entity comprising an organization or another user; receiving a request from a first entity to access the first data; determining whether the first entity satisfies the first conditions; determining whether a time at which the request is made is within the first time duration; and when the first entity satisfies the first conditions and when the request is made within the first time duration, permitting the first entity to access the first data.

In another aspect, a method implemented on a first electronic computing device for providing information regarding products and services from one or more organizations to one or more users comprises: receiving, at the first electronic computing device, the information regarding the products and services from the one or more organizations; receiving, at the first electronic computing device, a request from one or more users to subscribe to the information regarding the products and services from one or more of the one or more organizations; receiving, at the first electronic computing device, one or more offers regarding one or more of the products or services from the one or more organizations; and sending, from the first electronic computing device, one or more of the one or more offers to the one or more users who have subscribed to the information regarding the products and services from the one or more organizations.

In yet another aspect, an electronic computing device comprises: a processing unit; and system memory, the system memory including instructions which, when executed by the processing unit, cause the electronic computing device to: receive from a user first data to be made available for access on the electronic computing device; receive from the user one or more selections of one or more entities that are designated by the user as being permitted to access at least a portion of the first data, an entity comprising an organization or another user; receive from the user one or more fields of the first data for which the one or more entities are permitted to access second data, the second data corresponding to the one or more fields of the first data; receive from the user an end date associated with at least one of the one or more fields of the second data; receive a request from a first entity to access one or more fields of the second data, the first request including a password; determine whether the first entity is permitted to access the second data; determine whether the first entity is permitted to access the one or more fields of the second data; determine whether a time that within the request is made is earlier or the same as an end date associated with the at least one of the one or more fields of the second data; determine whether the password is a correct password to permit access to the at least one of the one or more fields of the second data; and when a determination is made that the first entity is permitted to access the one or more fields of the first data, when a determination is made that the time at which the request is made is earlier or the same as the end date associated with the at least one of the one or more fields of the second data and when a determination is made that the password to permit access to the at least one of the one or more fields of the second data is correct, permit the first entity to access the one or more fields of the second data.

DESCRIPTION OF THE DRAWINGS

FIG. 5 shows an example user interface for customers of the customer centric grid of FIG. 2.

FIG. 6 shows another example user interface for customers of the customer centric grid of FIG. 2.

DETAILED DESCRIPTION

Figure 1:
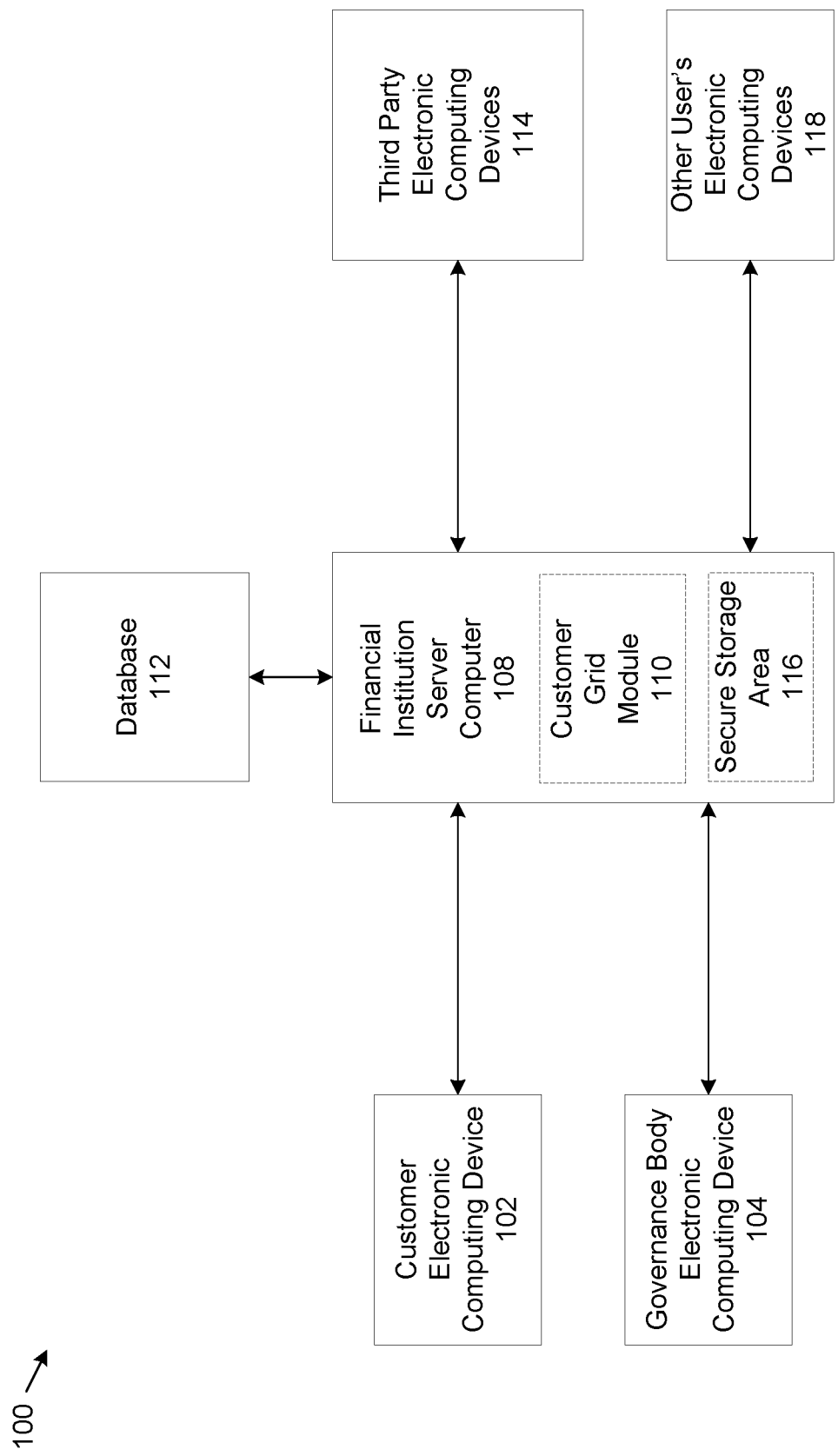
FIG. 1 shows an example system that supports a customer centric grid.

The present disclosure is directed to systems and methods that support a customer centric grid for customer services. The customer centric grid comprises one or more electronic computing devices at a known location in which customers can provide personal information, in which third parties can offer products and services and/or in which customers can be in control of any personal information provided to the third parties. The one or more electronic computing devices can be accessible to both customers and third parties over a network such as the Internet.

In one example implementation, the customer centric grid can be controlled by a financial institution, such as a bank. The customer can open one or more financial accounts at the financial institution and can apply for a variety of services at the financial institution including personal loans, credit cards and mortgages. The customer can provide personal information to the financial institution when applying for the services. The personal information can include name, address, date of birth, driver's license, social security number, employer name, salary, value of personal assets such as homes, vehicles and jewelry, value of any outstanding loans, information regarding the customer's spouse and children, personal goals of the customer such as vacation trips the customer may be interested in taking, purchases the customer may be interested in making, for example a new car, and other personal information.

The financial institution can use some or all of the customer's information on the customer centric grid. As explained in more detail later herein, the financial institution can obtain product and service information from a plurality of product and service providers and make the product and service information available on the customer centric grid. The customer centric grid can match offers for products and services with customer needs and permit offers to be made to the customers. The customers can decide which, if any offers to accept and can decide which, if any personal information can be made available to the product and service providers via the customer centric grid. The customer can also specify a time period for which the personal information can be used.

In another implementation, the customer centric grid may be implemented on one or more third party computer systems and the financial institution may be just one of the service providers on the customer centric grid. In this disclosure, the customer centric grid is described as being on one or more server computers of the financial institution and controlled by the financial institution.

In an example operation, the customer can request information from the customer centric grid regarding mortgages offered by mortgage vendors on the customer centric grid. The mortgage vendors can be banks or other mortgage offering financial institutions that have registered on the customer centric grid. The customer centric grid can determine which if any mortgage vendors can offer mortgages appropriate to the customer's needs. The customer centric grid can then send information regarding the mortgage offers to the customer.

When the customer selects one of the mortgage offers or requests more information regarding the mortgage offers, for example from a bank, the bank can send the information to the customer via the customer centric grid. The bank can also request additional information from the customer. For example, the bank may request information regarding the customer's name, address, social security number, employer, current salary or other information. If the customer decides to provide the requested information to the bank, the customer can initiate a policy that can define what information is to be provided and how long the information can be used. The information can then be encrypted and a transaction including the information can be sent to the bank. The transaction can be sent using a one-time password (OTP) that expires after the information is sent. As explained later herein, the customer may need to use a new OTP for each transaction with the bank. When the time period for the use of the information expires, no additional transactions can be made until another offer is accepted from the bank by the customer.

The customer centric grid can provide security for the customer information. In addition to the encryption of transmitted data and the use of an OTP, the customer centric grid can provide secure areas for storing a subset of customer data that can be transmitted to a service provider. In this disclosure, each subset of such customer data is referred to as a locker. The customer data can be stored in the locker for a limited period of time, corresponding to a policy for the data. In addition, customer centric grid can specify who can access the customer data in the locker, for how long and what can be done with the customer data. As used in this disclosure, access can comprise one or more of read access, write access and read/write access.

In addition to providing banking services, the customer centric grid can provide access to services from a variety of organizations and devices, including product vendors, government agencies, law enforcement organizations, health care providers, credit score organizations, energy companies and Internet of Things (TOT) devices. The use of these services is described in more detail later herein. Other services can be provided.

The customer centric grid also provides a governance policy that provides rules that can specify how registered organizations can access the customer centric grid, how customers can access the customer centric grid, that specify protocols that can be used when conducting transactions using the customer centric grid and that specify how and where customer information used in transactions can be stored on and accessed in the customer centric grid.

The systems and methods disclosed herein are directed to solving a problem in computer technology relating to providing security for personal information. As discussed above herein, the systems and methods permit a customer of a financial institution to have control of personal information that can be made available to third parties by the financial institution. The systems and methods permit the customer to specify which personal information can be made available to which third parties and for how long. In addition, the personal information to be made available to the third parties can be stored in a temporary secure location that can be password controlled and the temporary secure location can be cleared when a time duration for the personal information has expired.

FIG. 1 shows an example system 100 that can provide a customer centric grid for customer services. The example system 100 includes a customer electronic computing device 102, a governance body electronic computing device 104, a financial institution server computer 108, a database 112, third party electronic computing devices 114 and other user's electronic computing devices 118. The financial institution server computer 108 includes a customer grid module 110 and a secure storage area 116. Also included in FIG. 1, but not shown, is a network that can connect the customer electronic computing device, the governance body electronic computing device 104, the database 112, the third party electronic computing devices 114 and the other user's electronic computing devices 118 to the financial institution server computer 108. The network can be a computer network such as the Internet.

The example customer electronic computing device 102 is a personal electronic computing device of the customer that can comprise a desktop computer, a laptop computer, a smartphone or a table computer. The customer can access the financial institution server computer 108 from the customer electronic computing device 102 and can register for the customer centric grid. The customer can also create and access one or more customer financial accounts on financial institution server computer 108 and can apply for and obtain status of one or more financial services offered by the financial institution associated with financial institution server computer 108. Once registered for the customer centric grid, the customer can also access additional services via the customer centric grid.

The example governance body electronic computing device 104 is an electronic computing device that can be used by a governance body that can establish and update a governance policy of the customer centric grid. The governance body can be associated with the financial institution of the financial institution server computer 108 or the governance body can be an independent entity selected by organizations that are registered with and associated with the customer centric grid. As used in this disclosure, an entity can comprise an organization, such as organizations at third party electronic computing devices 114 or individual users of the customer centric grid, such as the customer, friends and family of the customer and other individual users.

The example financial institution server computer 108 is a server computer at a financial institution, such as a bank. The customer can have one or more financial accounts at the financial institution. For the example system 100, financial institution server computer 108 also hosts the customer centric grid. Hosting the customer centric grid comprises registering business and other organizations that provide services to customers and registering customers who can access the services provided by the business and other organizations.

The example customer grid module 110 implements functionality of the customer centric grid on financial institution server computer 108. As discussed in more detail later herein, the functionality includes registering customer and vendors, providing policies for handling data and transactions between the customers and vendors, implementing operations on the customer centric grid, providing security for transactions and data, providing analytics for transactions on the customer centric grid, auditing behaviors of customers and vendors, providing emergency management, providing virtual personal assistant (VPA) capabilities based on the data on the grid and providing rating of services provided on the customer centric grid. Other functionality is possible.

The example secure storage area 116 can store on a temporary basis data that the customer has made available to a specific organization on the customer centric grid 200. In FIG. 1, the secure storage area 116 is shown as being a part of financial institution server computer 108. In other implementations, the secure storage area 116 can be implemented on other server computers or databases within the customer centric grid and assessable from financial institution server computer 116. The secure storage area 116 is discussed in more detail later herein.

The example database 112 is an electronic database associated with the financial institution that is accessible from financial institution server computer 108. Database 112 can store account and profile information for a plurality of customers of the financial institution.

Database 112 can also implement transactions on the customer centric grid 200 using a distributed ledger or a smart contract. As used in this disclosure, a distributed ledger is a digital record of transactions on the customer centric grid 200 and a smart contact is a computer protocol that can facilitate a contract between two or more entities on the customer centric grid 200. Database 112 can have clusters than can facilitate a plurality of requests that can be validated by a customer for sharing and modifying. A smart contract can include a permission to read data in whole or in part from two or more entities on the customer centric grid 200. Database 112 can be designed such that each entity on the customer centric grid 200 (for example entities 202, 204, 206, 212, etc.) can be requesters or senders of smart contracts. The customer grid module 110 can be a validator of the smart contracts at a financial institution level and customer electronic computing device 102 can be a validator of smart contracts between IOT devices 216.

The example third party electronic computing devices 114 are electronic computing devices at business and government organizations that can subscribe to and access the customer centric grid. As discussed in more detail later herein, the business and government organizations can include subscribing vendors, third party financial institutions, government agencies, law enforcement organizations, health care providers, credit score organizations, energy companies, and other business and government organizations. The third party electronic computing devices 114 can also include Internet of Things (IOT) sensor devices.

The example other user's electronic computing devices 118 include electronic computing devices from users other than the customer. This can include electronic computing devices of friends and family of the customer, from other customers of the financial institution and from other users of the customer centric grid. The electronic computing devices can include one or more of smartphones, tablet computers, laptop computers and desktop computers.

Figure 2:
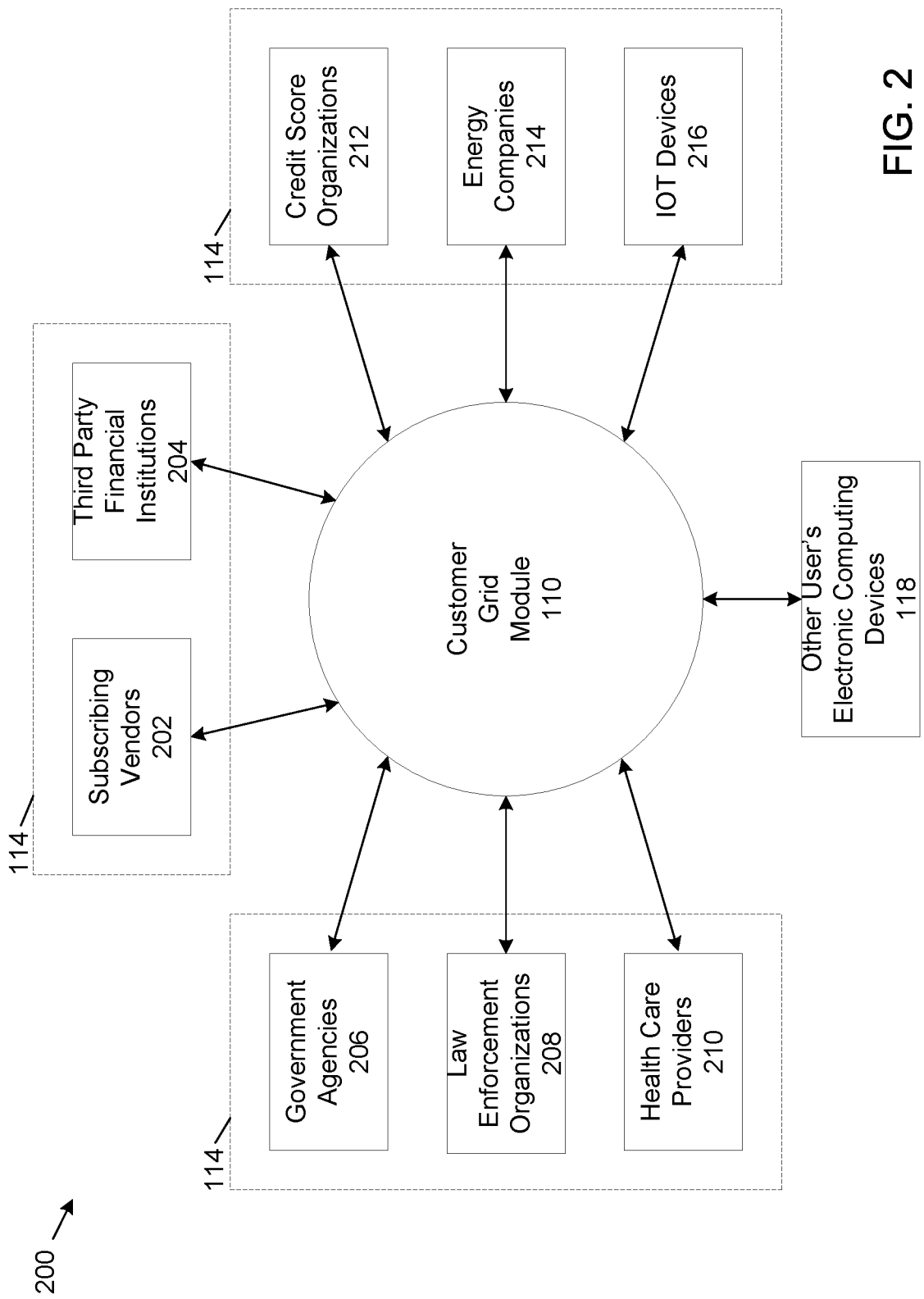
FIG. 2 shows an example customer centric grid for the system of FIG. 1.

FIG. 2 shows an example customer centric grid 200. The example customer centric grid 200 includes customer grid module 110 FIG. 1. The customer centric grid 200 also includes third party electronic computing devices 114 from FIG. 1. The third party electronic computing devices 114 include electronic computing devices of subscribing vendors 202, third party financial institutions 204, government agencies 206, law enforcement organizations 208, health care providers 210, credit score organizations 212, energy companies 214 and IOT devices 216. Other third party electronic computing devices 114 are possible. The customer centric grid 200 also includes other user's electronic computing devices 218.

The example subscribing vendors 202 are typically business organizations that can provide products and services to customers on the customer centric grid 200. The subscribing vendors 202 can use the customer centric grid 200 to identify customer needs. The subscribing vendors 202 then use the customer centric grid 200 to make offers of products and services to appropriate customers.

The example third party financial institutions 204 are financial institutions such as banks and investment firms that can offer financial products and services to customers on the customer centric grid 200. In a manner similar to that for subscribing vendors 202, the third party financial institutions 204 can use the customer centric grid 200 to identify customer needs and then use the customer centric grid 200 to make offers of products and services to appropriate customers. The third party financial institutions 204 are designated as third party because they are generally not associated with the financial institution corresponding to financial institution server computer 108, in which the customer has a primary account.

The example government agencies 206 can be local or national government agencies, such as motor vehicle bureaus, passport bureaus, property assessment offices, records departments, the social security administration and other local and national government agencies. The government agencies 206 can provide services to customers on the customer centric grid 200 and can also verify customer information for authorized parties on the customer centric grid 200, for example verifying a customer's social security number, driver's license number and other information.

The example law enforcement organizations 208 can include police, sheriff, and federal law enforcement agents. The law enforcement organizations can process background check and other similar requests made regarding customers on the customer centric grid 200.

The example health care providers 210 can include doctor's offices, clinics, medical centers and hospitals that can provide information regarding customer's health and medical history. The health care providers 210 can also offers of products and services regarding health care to customers identified via the customer centric grid 200 as possible candidates for these products and services.

The example credit score organizations 212 are credit score organizations such as Experian, Equifax and TransUnion that can provide credit score information to authorized requests for this information on the customer centric grid 200. The credit score information can be requested by organizations on the customer centric grid 200 when a need arises to verify credit score information for a customer. The credit score information, a time duration for which the credit score information is valid, and a name of a certifying authority company (e.g. Experian, Equifax or TransUnion) can be also stored on the grid.

The example energy companies 214 can be traditional energy companies such as gas and electric utilities that can provide offers regarding products and services to customers on the customer centric grid 200. The energy companies 214 can also include alternative energy companies that provide energy to customers via alternate sources such as wind and solar. The alternative energy companies 214 may be able to offer carbon credits to the customer when the customer uses the alternative energy sources, such as green energy, instead of energy derived from fossil fuels.

The example IOT devices 216 include one or more sensor devices embedded with electronics and software and having Internet connectivity. The IOT devices 216 can include sensor devices in customer's homes that can sense home temperature and energy use and other home data and make this home data available to the customer centric grid 200. The IOT devices 216 can be used by organizations on the customer centric grid 200 to make products and services offers to customers. For example, energy companies 214 can use home temperature and energy use information from IOT devices to determine whether to offer carbon credits to customers. Financial institutions can offer products to convert the carbon credits to a monetary value. A monetary amount can be deposited to a financial account, can be used to pay an existing loan or can be used for other purposes.

The other user's electronic computing devices 118 include electronic computing devices from users other than the customer. This can include electronic computing devices of friends and family of the customer, from other customers of the financial institution and from other users of the customer centric grid 200. The users of the other user's electronic computing devices 118 can access data on the customer centric grid 200 and share data on the customer centric grid 200 in the same manner as the customer at customer electronic computing device 102.

Figure 3:
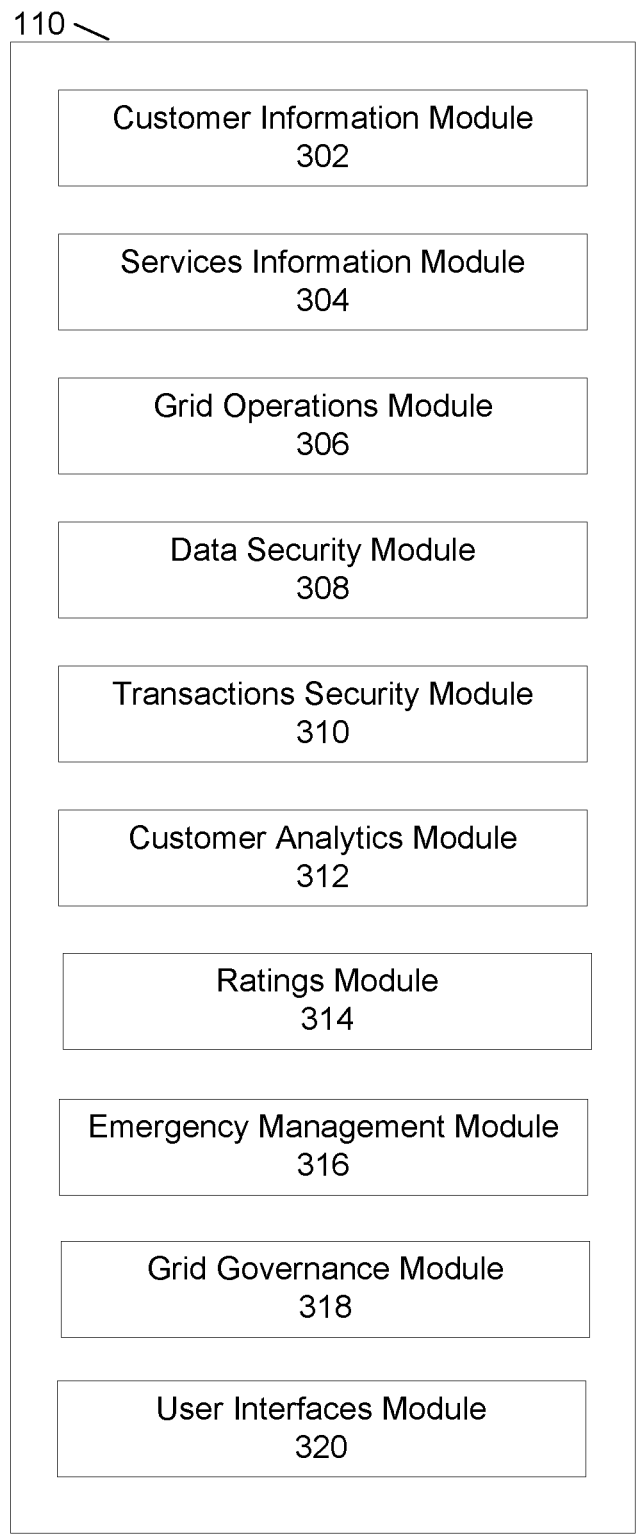
FIG. 3 shows example modules of the customer centric grid module of FIG. 2.

In addition to receiving information from third electronic computing devices of the organizations shown in FIG. 3 and from other third electronic computing devices, the customer centric grid 200 can receive other information from the financial institution server computer 108. For example, the financial institution server computer 108 can provide authorized personal information and authorized information regarding the personal health of the customer to organizations on the customer centric grid 200.

FIG. 3 shows example modules of the customer grid module 110. The example modules include a customer information module 302, a services information module 304, a grid operations module 306, a data security module 308, a transactions security module 310, a customer analytics module 312, a ratings module 314, an emergency management module 316, a grid governance module 318 and a user interfaces module 320. More, fewer or different modules are possible.

The example customer information module 302 accumulates information on customers who have subscribed to the customer centric grid 200. Based on permissions granted by the customer, the accumulated information can then be made available to third party organizations that participate on the customer centric grid 200. As discussed earlier herein, each customer can select which information can be made available to third party organizations and for how long the information can be accessed.

The example services information module 304 accumulates information regarding services and products provided by the third party organizations. In some implementations, third party organizations such as subscribing vendors 202 and third party financial institutions can provide information regarding products and services they offer. The services information module 304 can make this information available on a user interface of the customer centric grid 200 for subscribing customers to view. In some implementations, the third party organizations may send information regarding the products and services they offer directly via email to prospective customers.

The example grid operations module 306 can provide an interface between customers and organizations on the customer centric grid 200. The grid operations module 306 can manage the type of information customers want to share with organizations on the customer centric grid 200 and manage offers of products and services received from organizations for customers. For example, the grid operations module 306 can determine what customer needs are and what organizations on the customer centric grid 200 are providing offers of products and services that can meet the customer's needs. The grid operations module 306 can then inform the customer of the offers. The grid operations module 306 can also obtain ratings for the products and services offered by the organizations and provide the ratings along with offers.

The example data security module 308 implements a secure environment for customer data made available to organizations on the customer centric grid 200. In this implementation, the secure environment comprises a secure storage area, secure storage area 116, on the customer centric grid 200 that can store on a temporary basis data that the customer has made available to a specific organization on the customer centric grid 200. The temporary basis corresponds to a time limit the customer has put on how long the data is to be made available.

The secure storage area is also referred to herein as an information locker. There can be a plurality of information lockers, one for each combination of customer and organization to whom customer data is to be shared. In some implementations, each item of customer data can be stored in a separate secure area, referred herein as a micro locker. Customer data in each information locker can comprise customer data in a plurality of micro lockers. An example structure for a secure storage area that includes information lockers and micro lockers is discussed later herein, with respect to FIG. 4.

The data security module 308 can also implement one or more application program interfaces (APIs) that can provide access to organizations to access the customer data in an information locker. The customer centric grid 200 can include a plurality of information lockers.

The example transactions security module 310 implements a security mechanism for transactions in which organizations access customer data on the customer centric grid 200. The security mechanism can comprise an OTP that can be required of an organization each time the organization requests to access customer data on the customer centric grid 200. For example, when a request for access to the customer data is received from an organization, the transactions security module 310 can authorize the request and provide an OTP for the organization to use. Once the customer data is accessed using the OTP, the OTP is destroyed. For each new request for data a new OTP is required. The transactions security module 310 can also implement an encryption of the customer data that is being accessed.

The example customer analytics module 312 can provide a variety of statistics regarding transactions occurring on the customer centric grid 200. The statistics can include transactions made by each customer, third party organizations accessed, types of products and services being offered, data from IOT devices such as energy data for the customer's home and health data such as exercise statistics for the customer and other statistics. The customer analytics module 312 can also provide audit statistics for a customer, such as how often the customer uses the customer centric grid 200, offers for products and services made the customer, purchase of products and services by the customer and other statistics.

The example ratings module 314 provides customer ratings of products and services used by customers on the customer centric grid 200. After a customer uses a product or service, the customer can rate the product or service via a user interface. The ratings can be used by other customers when deciding whether to accept offers of product or services by product or service providers on the customer centric grid 200.

The emergency management module 316 can permit customers to sign up for a policy that can alert family and other members and initiate actions when the customer centric grid 200 receives information than an accident or a death has occurred to the customer. For example, when an accident occurs, a health care provider, law enforcement organization or another organization can send a transaction on the customer centric grid 200. If a death occurs, the health care provider, law enforcement agency, government agency or other organization can send a transaction to the customer centric grid 200. The transaction can provide a notification of the accident or death to family members and other beneficiaries and provide information regarding the accident or death.

The example grid governance module 318 provides policies regarding usage of data on the customer centric grid 200. The policies can define type of transactions that are permitted, types of products and services that are permitted and limits on how long customer data can be stored. Customers can setup policies that can define what type of data they can make available on the customer centric grid 200, how long the data is to be available and restrictions on how the data is to be used by third party organizations on the customer centric grid 200. The policies can also define consequences for misuse of the data, such as having third party organizations removed from the customer centric grid 200 when the third party organizations misuse the customer data or otherwise violate the policies. The policies can also define situations regarding misuse of data in which the customer centric grid 200 can be locked down and prevented from operating. A grid governance team comprised of selected individuals can manage the policies. However, the grid governance team cannot interfere with transactions on the customer centric grid 200.

The example user interfaces module 320 implements a plurality of user interfaces for customers and third party organizations on the customer centric grid 200. As discussed in more detail later herein, one of the user interfaces can provide for a selection of actions available to customers on the customer centric grid 200. Another user interface can permit a customer to create a profile that can include personal information and interests. Another user interface can permit the customer to select which of the personal information can be shared with the third party organizations. Yet another user interface can permit third party organizations to list products and services and display offers to customers. Other user interfaces are possible.

Figure 4:
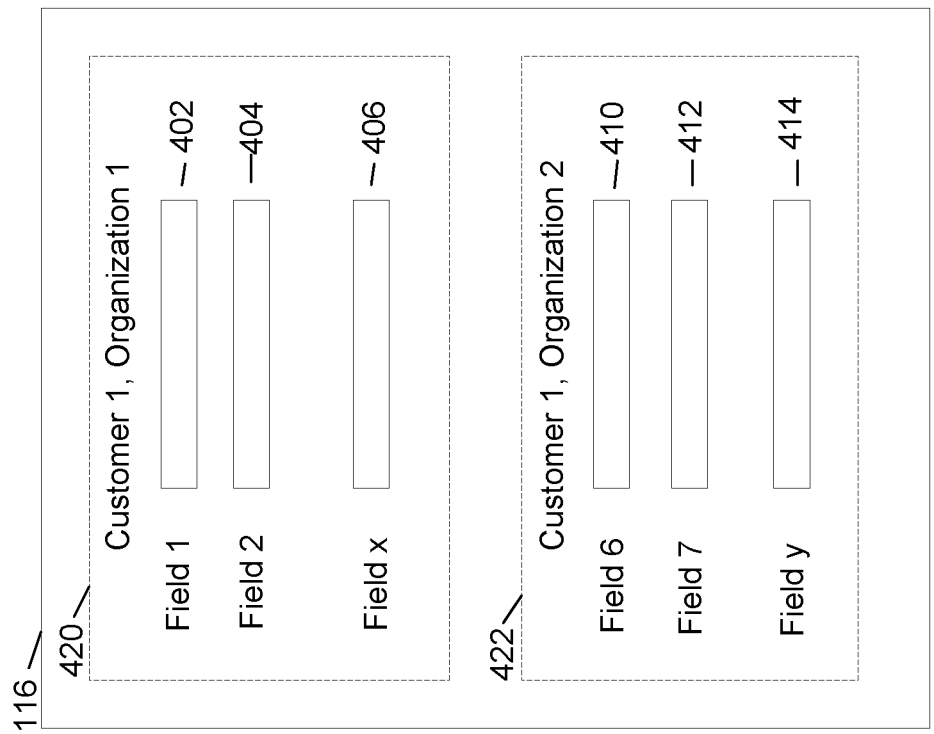
FIG. 4 shows an example structure of the secure storage area of FIG. 1.

FIG. 4 shows an example structure of secure storage area 116 of FIG. 1. The example secure storage area 420 comprises example information lockers 420 and 422. Each information locker 420 and 422 is comprised of one or more micro-lockers, each micro-locker corresponding to storage of a specific data field. The secure storage area 116 can include additional information lockers, not shown in FIG. 4.

As shown in FIG. 4, example information locker 420 corresponds to data that is to be shared between customer 1 and organization 1. Information locker 420 includes up to n micro-lockers 402-408, each micro-locker representing a field of data to be shared with organization 1. For example, field 1, corresponding to micro-locker 402, can store a financial account number for customer 1, field 2, corresponding to micro-locker 402, can store a name of the customer's spouse and field n, corresponding to micro-locker 406, can store an age of the customer's youngest child. More, fewer or different data can be stored in micro-lockers 402-408.

Similarly, information locker 422 corresponds to data that is to be shared between customer 1 and organization 2. Information locker 422 includes up to y micro-lockers 410-414, each micro-locker representing a field of data to be shared with organization 2. For example, field 6, corresponding to micro-locker 410, can store the financial account number for customer 1, field 7, corresponding to micro-locker 412, can store the name of the customer's spouse and field y, corresponding to micro-locker 414, can store the customer's driver's license. More, fewer or different data can be stored in micro-lockers 410-414.

In the implementation shown in FIG. 4, some data is duplicated in separate micro-lockers. For example, the financial account number for the customer is stored both in micro-lockers 402 and 410. The reason for duplicating data storage is that each field can have different lifetimes. For example, shared data for customer 1, organization 1 may expire and be deleted from secure storage area 116 before shared data for customer 1, organization 2 has expires. In other implementations, data may not be duplicated. Instead, a link to the data may be different for each customer/organization combination and when a time for shared data expires for an organization, one or more links can be deleted. Other implementations are possible.

FIG. 5 shows an example user interface 400 for customers. The user interface 400 can be displayed on a customer electronic computing device when the customer logs into the customer centric grid 200 on financial institution server computer 108. The customer login to the customer centric grid 200 can be separate from a customer login to a customer financial account on financial institution server computer 108.

The user interface 400 includes an example welcome message 402 and display of a customer identification number 404. The user interface 400 also displays a plurality of checkboxes corresponding to a plurality of actions that the customer can take. The plurality of actions include creating or editing a customer profile, viewing vendors, subscribing to vendors, viewing offers, creating requests for offers and viewing data to be shared. More, fewer or different actions are possible. In an alternative implementation, the plurality actions can be rendered in a menu from which the customer can make a selection.

When the customer checks checkbox 406, a user interface is displayed that can permit the user to create a personal profile or to edit an existing personal profile. The user interface can also permit the customer to enter personal interests. A detailed discussion of this user interface is provided later herein with regard to FIG. 6.

When the customer checks checkbox 408, a user interface is displayed that can list available product and service vendors on the customer centric grid 200 and that can describe the products and services offered by the vendors. The customer can decide which, if any, products and services are of interest. Products and services can also be listed and described from the customer's financial institution and from third party financial institutions. A detailed discussion of this user interface is provided later herein with regard to FIG. 9.

When the customer checks checkbox 410, the customer can subscribe to product and service vendors that are of interest. Subscribing can include agreeing to receive offers of products and services that may be available from the product and service. Subscribing can also include permitting the vendors to view the customer's interests from the customer profile and also to view all of part of the customer's personal information. The customer use the user interface for the customer's profile to identify which aspects of the customer's personal information can be shared, as discussed in more detail later herein. A detailed discussion of this user interface is provided later herein with regard to FIG. 7.

When the customer checks checkbox 412, a user interface is displayed in which the customer can create requests for offers. The customer can describe personal situations for which an offer can be appropriate. For example, the customer can indicate that the customer is interest in a vacation trip to a specific geographical area, the customer can indicate that the customer needs a new roof or siding for the customer's home, the customer can indicate that the customer is in the market for a new automobile or other product or service. Other examples are possible. The product and service vendors and financial institutions can view the customer's requests for offers and provide offers when appropriate. In some implementations, the customer profile of FIG. 6 can be used to create a request for offers. In other implementations, a separate user interface (not shown) can be used.

When the customer checks checkbox 414, the customer can view offers for products or services from the product and service vendors and third party financial institutions. The customer can decide which, of any, offers are of interest.

When the customer checks checkbox 416, a user interface is displayed on which the customer can view a summary of data the customer has agreed to share with product and service vendors and with financial institutions. The user interface, explained later herein with respect to FIG. 8, can show a summary of the data the customer as agreed with each product and service vendor and financial institution and can also show how long the data is accessible for the service vendors and financial institutions.

FIG. 6 shows an example user interface 500 for creating and editing a customer profile. The user interface 500 is displayed on the customer electronic computing device when the customer checks checkbox 406 on user interface 400. The user interface includes an example Customer Profile header 502. The customer profile shown in user interface 500 permits the customer to enter personal information 504 and also personal interests 506.

The example personal information 504 includes text boxes for entering the customer's name 508, address 510, telephone number 512, email address 514, age 516, spouse's name 518, spouse's age 520, information regarding children 522, information regarding vehicles owned 524, a checkbox 526 indicating whether the customer owns a home and when checkbox 526 indicates that the customer owns a home, a text box for information regarding a mortgage on the home. Additional personal information (not shown in FIG. 6) can include information regarding the customer's financial accounts, investments, taxes, employer, salary, job title, employment, employment history, degrees earned and other personal information. More, fewer or different personal information can be included.

Adjacent to the textboxes and checkboxes for personal information are two columns of checkboxes. Column 550 provides checkboxes indicating whether the customer wants to automatically import personal information associated with the checkbox automatically from a source or enter the personal information manually. When a checkbox in column 550 is checked, the customer is prompted for a location from where the information can be automatically imported. For example, the tax information may be imported from a tax return or other information than may be accessible from financial institution server computer 108. A URL for a website can also be used as a location to import personal information.

Column 550 provides checkboxes indicating whether the customer wants to share the personal information with vendors, third party financial organizations and other entities on the customer centric grid 200. When a checkbox in column 550 is checked, a user interface or dialog box can be displayed prompting or requesting additional information from the user. The additional information can include who the personal information associated with the checkbox is to be shared with and for how long. For example, if the checkbox in column 552 associated with mortgage information 528 is checked, the customer can choose who to share the mortgage information with and for how long. In general, the personal information shared as a result of checking checkboxes in column 550 is personal information that can be used by the vendors and financial institutions to determine whether it is appropriate to make offers to the customer. Once an offer is made, the customer can have another opportunity to share additional personal information with the entity making the offer, as explained in more detail later herein.

The user interface 500 also includes checkboxes that permit the user to select personal interests 506. The personal interests checkboxes 506 can include checkboxes for car loans 530, personal loans 532, vacations 534, college savings 536, refinance mortgage 538, retirement savings 540, home remodeling 542, credit cards 544 and other 546. When checkbox 546 for other is selected, the user can enter other personal interests in text box 548. In addition, the user can provide specific information regarding requested offers in text box 548. For example, the user can indicate an interest in a vacation trip to a specific location. More, fewer or different checkboxes can be included.

Figure 7:
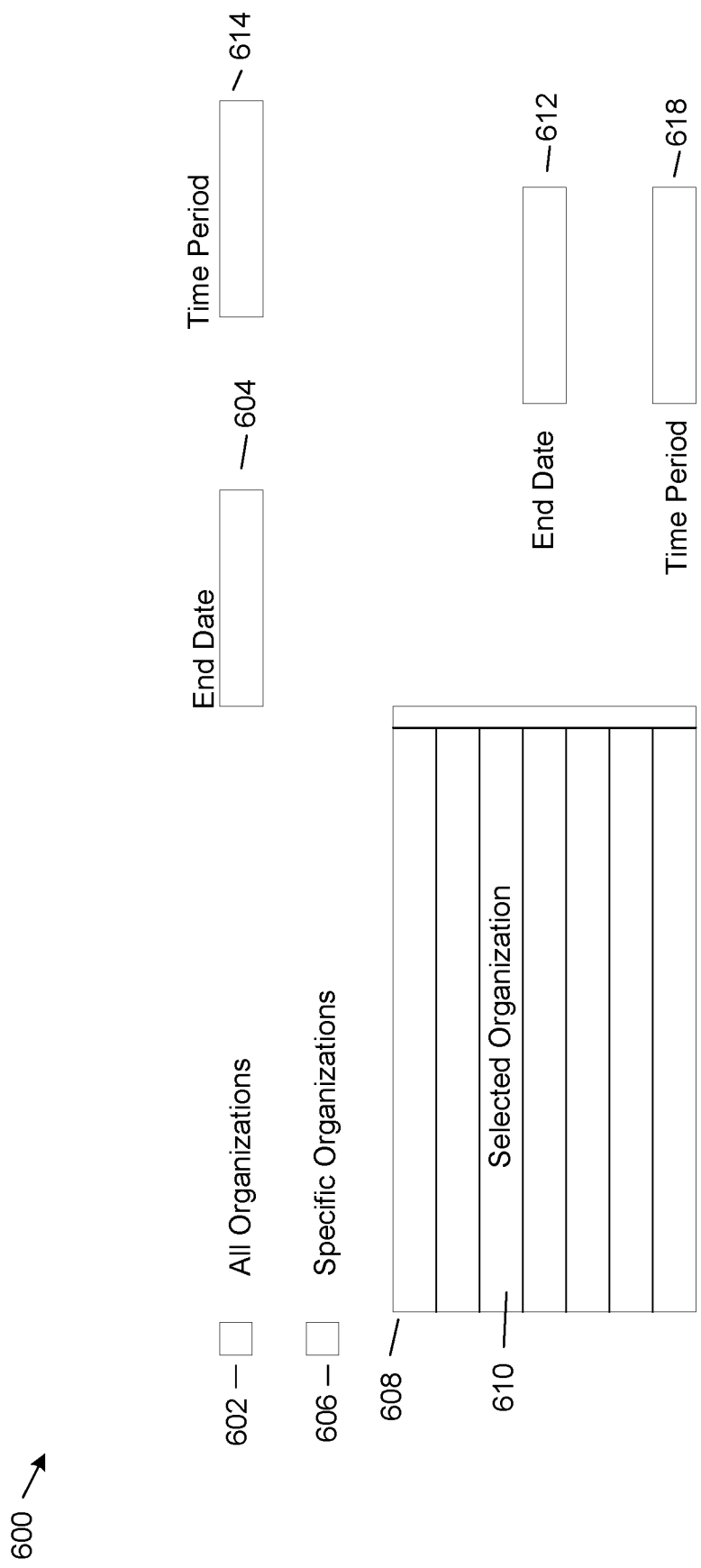
FIG. 7 shows yet another example user interface for customers of the customer centric grid of FIG. 2.

FIG. 7 shows an example user interface 600 for subscribing to the customer centric grid 200. The user interface 600 is displayed when the customer checks checkbox 410 on FIG. 5 for subscribing to vendors. The user interface 600 includes checkboxes for subscribing to all organizations and for subscribing to specific organizations. Organizations refer to both vendors and financial institutions.

When the customer checks checkbox 602, the customer subscribes to all organizations that can make offers for products and services on the customer centric grid 200. The checking of checkbox 602 can also display another user interface, similar to user interface 500 where the customer can select fields of personal information to be shared with the organizations that make offers for products and services. The sharing selections made can be different than those made in FIG. 6. In addition, when checkbox 602 is checked, an end date 604 text box is enabled. The customer can enter a date up to which the selected data can be shared. After the entered date, the shared data is no longer available. A calendar can be displayed when the customer clicks on end date text box 604 to help the customer enter an end date.

When the customer checks checkbox 606 for specific organizations, a drop-down list box 610 is enabled. The user can select one or more specific organizations to which the user wishes to share data. When the user selects a specific organization from the drop-down list box 610, the user interface similar to user interface 600 can be displayed. The user can select specific fields of personal information to share with the selected specific organization. In addition, for each specific field of personal information selected, the customer can enter a date into end date text box 612. The date entered into end date text box 612 specifies a date up to which the specific field of personal information can be shared. This process can be repeated for each specific field of personal information to be shared for each specific organization selected in which to share personal data. There can also be an option to select a time period other than a date. The example end time edit boxes 614 and 618 can permit a time period in minutes and hours to be entered. This can allow the customer to enable sharing of data to an entity for a time period shorter than a day. For example, a time period of 30 minutes or two hours can be used on a given date. In an example implementation, when the customer wants to enter a time period of less than a day, the time period can be entered into edit boxes 614 and 618. When the customer wants to enter a time period more than a day, end date edit boxes 604 and 612 can be used and edit boxes 614 and 618 can be blank.

Figure 8:
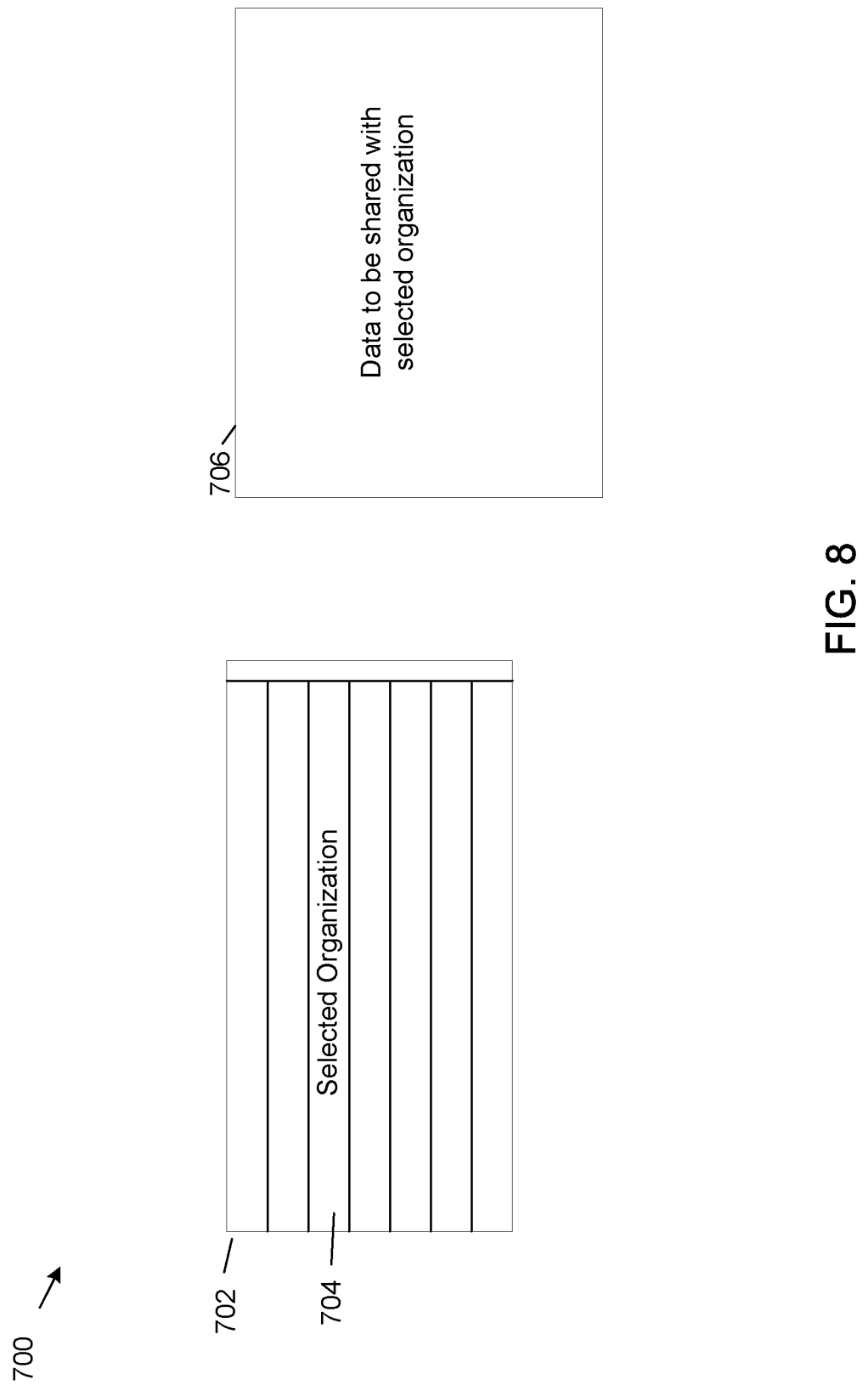
FIG. 8 shows yet another example user interface for customers of the customer centric grid of FIG. 2.

FIG. 8 shows an example user interface 700 for displaying personal data that is to be shared with selected organizations (vendors and financial institutions). The user interface 700 is displayed when the customer checks checkbox 416 for in FIG. 5 for viewing data to be shared.

User interface 700 includes a pull-down list box 702 and a text box 706. When an organization is selected from the pull-down list box, a summary of personal data fields that the customer previously permitted to be shared is displayed in text box 706. For example, when an organization 704 is selected, a summary for all customer personal data to be shared with organization 704 is displayed in text box 706. In addition, the end date for which each field of shared personal data is to be accessible is also displayed in text box 706.

Figure 9:
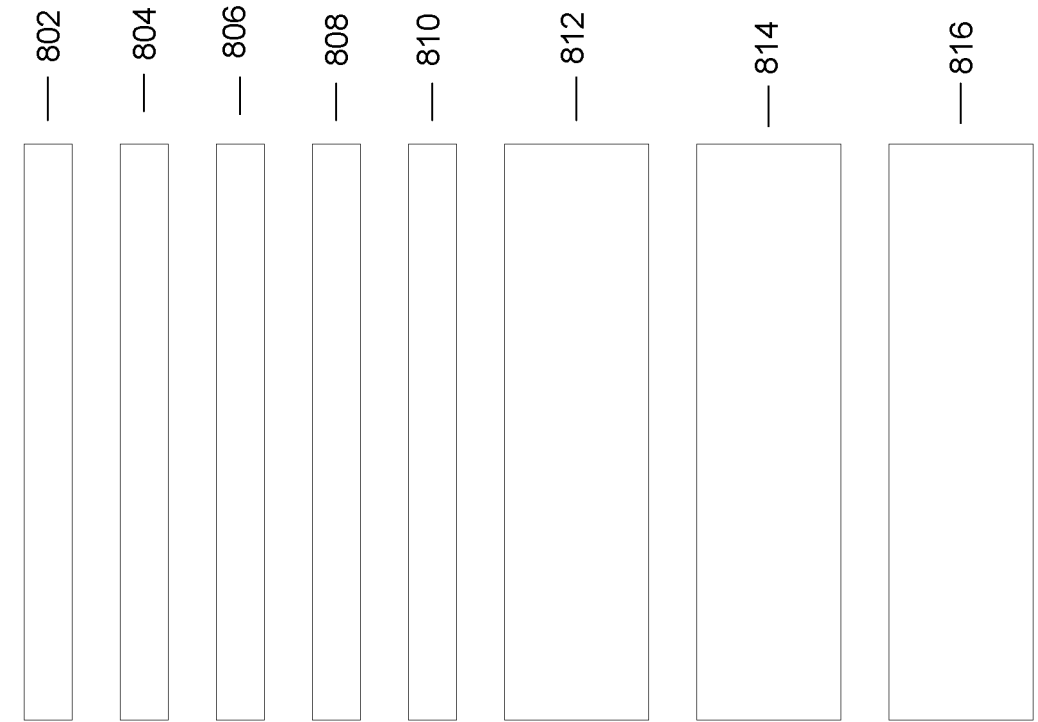
FIG. 9 shows a user interface for organizations of the customer centric grid of FIG. 2.

FIG. 9 shows an example user interface 800 for organizations (vendors and financial institutions). The user interface 800 can be displayed to an organization when the organization subscribes to the customer centric grid 200. User interface 800 includes text boxes for name of organization 802, address of organization 804, telephone number of organization 806, email address for organization 808, website uniform resource locator (URL) of organization 810, products offered by the organization 812, services offered by the organization 814 and promotions offered by the organization 816.

Figure 10:
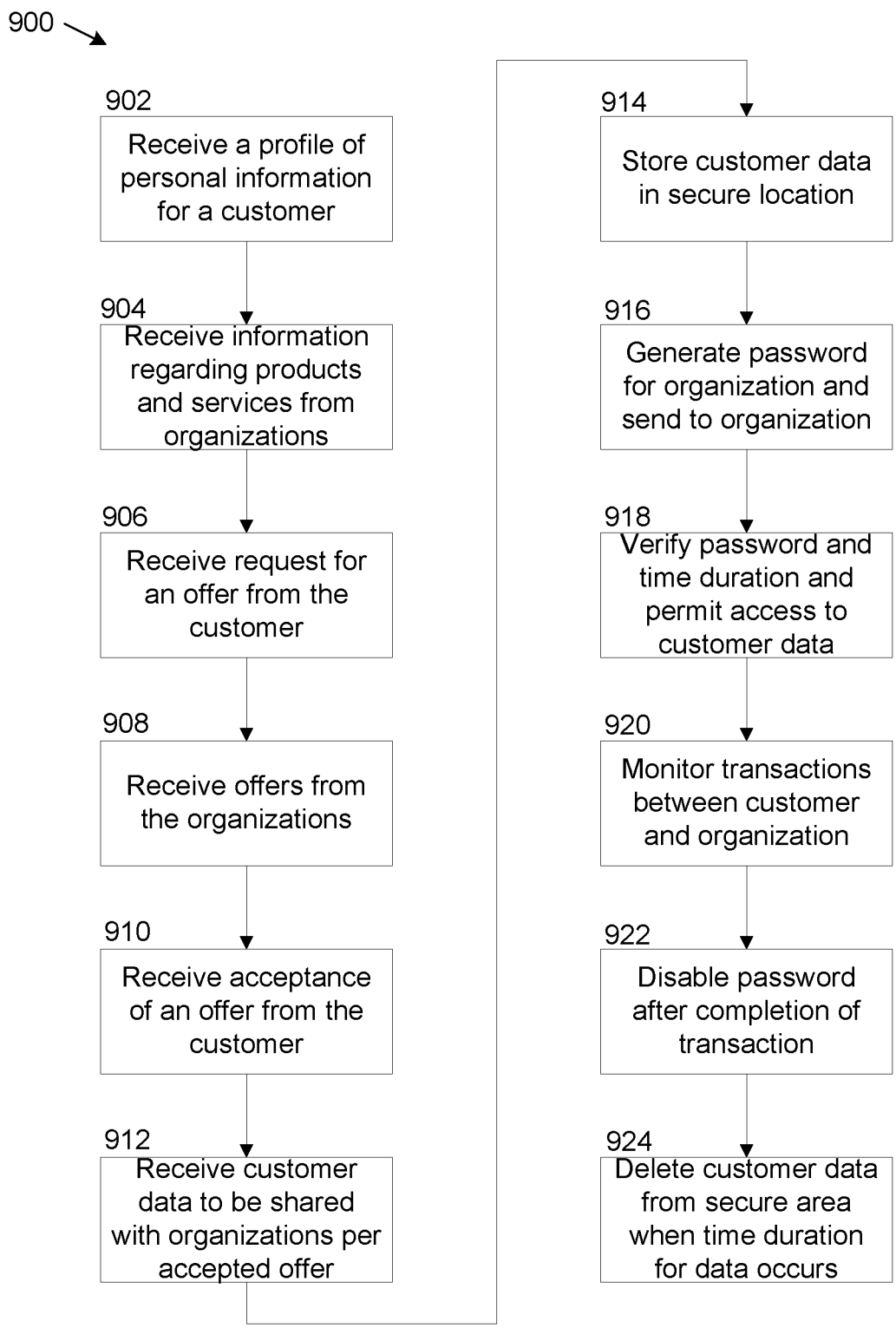
FIG. 10 a method for implementing transactions of the customer centric grid of FIG. 2.

FIG. 10 shows a flowchart of an example method 900 for implementing transactions on a customer centric grid. The customer centric grid, for example customer centric grid 200, includes a plurality of customers and a plurality of organizations. The organizations can be one or more of product and service vendors, financial organizations, including third party financial organizations, government agencies, law enforcement organizations, health care providers, credit score organizations, energy companies and other organizations. The customer centric grid can also include one or more IOT devices. The customer centric grid can be hosted on a server computer, in this example on financial institution server computer 108.

At operation 902, a profile of personal information for a customer is received at the server computer. The profile can include information regarding the customer such as names and ages of family members, information regarding customer assets such as investments, homes and vehicles, information regarding customer taxes and other personal information. The profile can also include interests of the customer, such as planning a vacation and saving for college. The customer can create the profile from a user interface, such as user interface 500 that can be rendered on an electronic computing device of the customer, such as customer electronic computing device 102.

At operation 904, information regarding products and services from organizations on the customer centric grid is received at the server computer. The organizations can enter information regarding their products on a user interface, such as user interface 800 that can be rendered on an electronic computing device of the organization, such as one of third party electronic computing devices 114.

At operation 906, a request is received at the server computer from the customer for an offer from one or more of the organizations on the customer centric grid. For example, the customer can request offers for a vacation to a specific destination, an offer to refinance a mortgage, an offer for a new vehicle or offers for other items in which the customer has an interest. The organizations on the customer centric grid can view the request for the offer, can view personal information regarding the customer that the customer has agreed to share and can determine whether an appropriate offer can be made.

At operation 908, one or more offers relating the customer's request are received at the server computer from one or more of the organizations. The server computer can send a notification of the receipt of the one or more offers to the customer.

At operation 910, an acceptance of an offer is received at the server computer from the customer. The customer can accept the offer based on a review of the one or more offers and a determination as to which, if any, of the offers is acceptable.

At operation 912, customer data to be shared with one or more organizations is received from the customer at the server computer. Typically, the customer can decide to share the customer data with the organization making the offer that the customer accepted. The customer can decide which fields of data in the customer profile can be shared with the organization and for how long. In some cases, the organization making the offer may request specific information from the customer in relation to the customer. For example, a mortgage company making an offer regarding refinancing a mortgage may specifically request information about a current mortgage on the customer's home and request information about the customer's current employment and salary. The customer can also decide to make some of the customer data accessible to other organizations besides the organization making the offer. For example, the customer may realize that the mortgage company may need to verify information regarding the customer's employment and current mortgage and other personal information such as social security number and driver's license. As a result, the customer may decide to make part of the customer data available to certain third party financial institutions, government agencies, credit score agencies, etc.

At operation 914, the customer data is stored at a secure location on the server computer or on a database accessible from the server computer. The location is considered secure because in order for organizations to access the customer data, the organizations may need to provide a password, typically a one-time password, and also meet certain conditions for accessing the data. The conditions can include verifying that the customer has given the organization requesting the data permission to access the data and verifying that a date and time in which the organization is requesting the data is within a time duration or end date specified by the customer for the data.

At operation 916, the customer centric grid generates a password for the organization to access the data and sends the password to the organization. The password is for a specific subset of the data and is valid for a specific time period.

At operation 918, a request for the data is received at the server computer. The customer centric grid verifies that the password is valid, that the request is within the permitted time duration and that the request is for fields of the customer data for which the organization is permitted to access. When verified, the customer centric grid permits access to requested customer data by the organization.

At operation 920, transactions between the customer and the organization are monitored and stored on the server computer. The transactions can include requests to access customer data by the organization, transactions giving permissions and passwords to the customers, and other exchanges between the customer and the organization via the customer centric grid.

At operation 922, the password is disabled after the completion of a transaction in which the organization accesses the customer data. If the organization needs to access the customer data again, the organization needs to request access again from the customer centric grid, and if the customer centric grid approves the access request, the customer centric grid sends the organization another password.

At operation 924, when the time duration for accessing the customer data expires, the customer centric grid deletes the customer data from the secure area. At this point, the organization can no longer access the customer data. If the organization needs to access the customer data again, the organization needs to make another request for the customer data. Depending on the circumstances, the customer centric grid can accept or deny the request. For example, if the organization has already accessed the customer data or if the request is for customer data for which permission is not given by the customer for the organization to access, the request can be denied.

Figure 11:
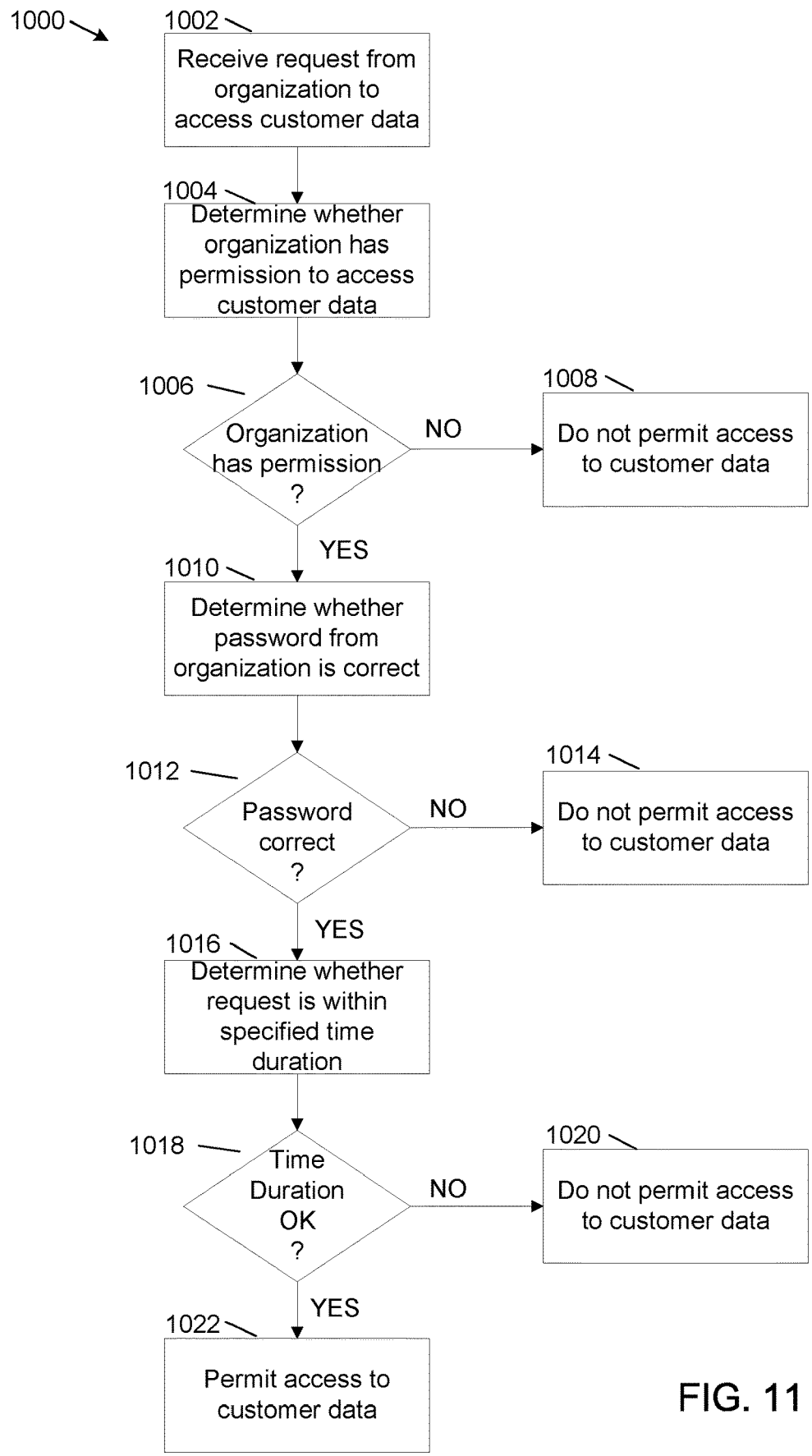
FIG. 11 shows a method for determining whether an organization can access customer data on the customer centric grid of FIG. 2.

FIG. 11 shows a flowchart of an example method 1000 for determining whether an organization can access a customer's data.

At operation 1002, a request is received from an organization at the customer centric grid of the server computer to access customer data.

At operation 1004, a determination is made as to whether the organization has permission to access the customer data. The customer can decide which, if any, fields of its personal data can be shared, can decide which organizations on the customer centric grid have permission to access specific fields of the personal data, can determine a time duration for which the specific fields of the customer data can be accessed.

At operation 1006 when a determination is made that the organization does not have permission to access the specific fields of the customer data, at operation 1008, the specific fields of the customer data are not permitted to be accessed by the customer.

At operation 1006 when a determination is made that the organization does have permission to access the specific fields of the customer data, at operation 1010 a determination is made has whether the organization has provided a password to access the customer data and whether the password is correct.

At operation 1012 when a determination is made that there is not a password or that the password is incorrect, at operation 1014, access is not permitted to the customer data.

At operation 1012 when a determination is made that the password is correct, at operation 1016 a determination is made as to whether the request for the customer data is within the specific time duration specified by the customer for accessing the customer data.

At operation 1018, when a determination is made that the request is not within the specific time duration, at operation 1020 access is not permitted to the customer data.

At operation 1018, when a determination is made that the request is within the specific time duration, at operation 1022 access is permitted for the organization to the customer data.

Figure 12:
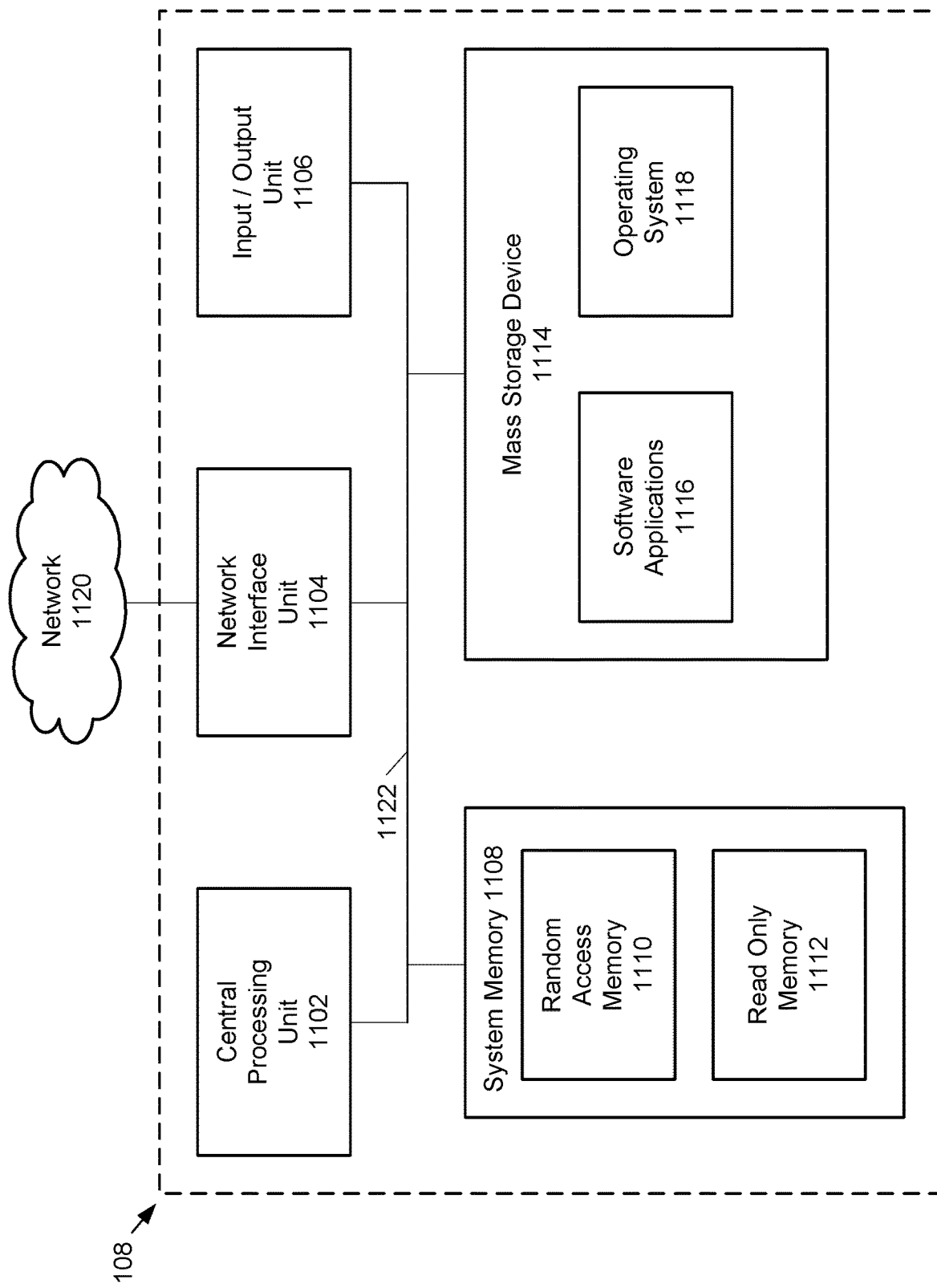
FIG. 12 shows example physical components of the financial institution server computer of FIG. 1.

As illustrated in the example of FIG. 12, financial institution server computer 108 includes at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system that contains the basic routines that help to transfer information between elements within the financial institution server computer 108, such as during startup, is stored in the ROM 1112. The financial institution server computer 108 further includes a mass storage device 1114. The mass storage device 1114 is able to store software instructions and data. Some or all of the components of the financial institution server computer 108 can also be included in the customer electronic computing device 102 and the governance body electronic computing device 104.

The mass storage device 1114 is connected to the CPU 1102 through a mass storage controller (not shown) connected to the system bus 1122. The mass storage device 1114 and its associated computer-readable data storage media provide non-volatile, non-transitory storage for the financial institution server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 108.

According to various embodiments of the invention, the financial institution server computer 108 may operate in a networked environment using logical connections to remote network devices through the network 1120, such as a wireless network, the Internet, or another type of network. The financial institution server computer 108 may connect to the network 1120 through a network interface unit 1104 connected to the system bus 1122. It should be appreciated that the network interface unit 1104 may also be utilized to connect to other types of networks and remote computing systems. The financial institution server computer 108 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the financial institution server computer 108 can store software instructions and data. The software instructions include an operating system 1118 suitable for controlling the operation of the financial institution server computer 108. The mass storage device 1114 and/or the RAM 1110 also store software instructions, that when executed by the CPU 1102, cause the financial institution server computer 108 to provide the functionality of the financial institution server computer 108 discussed in this document. For example, the mass storage device 1114 and/or the RAM 1110 can store software instructions that, when executed by the CPU 1102, cause the financial institution server computer 108 to display received data on the display screen of the financial institution server computer 108.

Computing devices 102, 104, and 114 can be configured in a manner similar to that of the financial institution server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a first electronic computing device for facilitating access to user information, the method comprising:
   receiving, from a user, first data to be made available for access by a first entity on the first electronic computing device, the first data including information relating to personal interests of the user, the first entity being a first organization or another user other than a controller of the first electronic computing device;
   storing the first data in a secure area of the first electronic computing device;
   receiving, from the user, a first time duration for which the first data is permitted to be accessed from the secure area by the first entity, the first data in the secure area being unavailable for access by the first entity after the first time duration has elapsed;
   receiving, from the user, first conditions to be met in order for one of a plurality of entities to access the first data;
   receiving a request from the first entity to access the first data;
   determining whether the first entity satisfies the first conditions;
   determining whether a time at which the request is made by the first entity is within the first time duration;
   when the first entity satisfies the first conditions and when the request is made within the first time duration, permitting the first entity to access the first data; and
   receiving information regarding a product or service offered by the first entity, the product or service being suggested by the first entity to meet a need of the user, based on the personal interests of the user identified in the first data.

2. The method of claim 1, further comprising:
   receiving from the user an identifier of one or more of the plurality of entities that are permitted to access the first data;
   determining whether the first entity is one of the plurality of entities that are permitted to access the first data; and
   when the first entity is not one of the plurality of entities that are permitted to access the first data, preventing the first entity from accessing the first data.

3. The method of claim 1, further comprising:
   receiving, from the first entity, a request for a first password;
   determining whether the first entity is one of the plurality of entities that are permitted to access the first data; and
   when a determination is made that the first entity is one of the plurality of entities that is permitted the first data, send a password for accessing the first data to the first entity.

4. The method of claim 1, further comprising:
   receiving from the first entity a first password for accessing the first data;
   preventing the first entity from accessing the first data until a determination is made that the first password is an acceptable password; and
   when a determination is made that the first password is an acceptable password, when the first entity satisfies the first conditions and when the request is made within the first time duration, permitting the first entity to access the first data.

5. The method of claim 4, wherein after the first entity accesses the first data, further comprising removing the first password as an acceptable password and preventing the first entity to access the first data again when using the first password.

6. The method of claim 1, wherein the first conditions to be met include:
a condition requiring an entity to be authorized by the user to access the first data; and
a condition requiring a valid password for accessing the first data.

7. The method of claim 1, further comprising preventing access to the first data after the first time duration expires.

8. The method of claim 1, further comprising removing the first data from a temporary storage location on the first electronic computing device after the first time duration expires.

9. The method of claim 1, further comprising:
prior to receiving the information regarding the product or service offered by the first entity:
receiving a request from the user to subscribe to product and service information from the one or more of the plurality of entities; and
sending, to the user, second product and service information from the one or more of the plurality of entities.

10. The method of claim 1, further comprising:
receiving ratings from one or more of the user and one or more additional users regarding a quality of products and services provided from the plurality of entities; and
making the ratings available to the user and the one or more additional users.

11. The method of claim 1, further comprising: receiving a first policy from the user, the first policy specifying rules regarding transmission of data between the user and the first entity, the first policy identifying the first data and the first conditions.

12. The method of claim 11, wherein the first policy is one or a plurality of policies that specify rules regarding transmission of data between users and organizations.

13. An electronic computing device comprising:
a processing unit; and
system memory, the system memory including instructions which, when executed by the processing unit, cause the electronic computing device to:
receive, from a user, first data to be made available for access on the electronic computing device, the first data including information relating to personal interests of the user;
receive, from the user, one or more selections of one or more entities that are designated by the user as being permitted to access at least a portion of the first data, an entity comprising an organization or another user;
receive, from the user, one or more fields of the first data for which the one or more entities are permitted to access second data, the second data corresponding to the one or more fields of the first data;
receive, from the user, an end date associated with at least one of the one or more fields of the second data;
receive a request from a first entity other than the user to access one or more fields of the second data, the request including a password;
determine whether the first entity is permitted to access the second data;
determine whether the first entity is permitted to access the one or more fields of the second data;
determine whether a time that the request is made is earlier or the same as the end date associated with the at least one of the one or more fields of the second data;
determine whether the password is a correct password to permit access to the at least one of the one or more fields of the second data;
when a determination is made that the first entity is permitted to access the one or more fields of the first data, when a determination is made that the time at which the request is made is earlier or the same as the end date associated with the at least one of the one or more fields of the second data and when a determination is made that the password to permit access to the at least one of the one or more fields of the second data is correct, permit the first entity to access the one or more fields of the second data;
receive information regarding a product or service offered by the first entity, the product or service being suggested by the first entity to meet a need of the user, based on the personal interests of the user identified in the first data.

\* \* \* \* \*